(12) United States Patent
Shin et al.

(10) Patent No.: US 7,023,514 B2
(45) Date of Patent: Apr. 4, 2006

(54) LIQUID CRYSTAL DISPLAY AND FABRICATING METHOD THEREOF

(75) Inventors: Chul Sang Shin, Chungcheongnam-do (KR); Gyo Won Chin, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 92 days.

(21) Appl. No.: 10/292,512

(22) Filed: Nov. 13, 2002

(65) Prior Publication Data

US 2003/0122977 A1   Jul. 3, 2003

(30) Foreign Application Priority Data

Dec. 27, 2001   (KR) ............................ P2001-86070

(51) Int. Cl.
*G02F 1/1339* (2006.01)

(52) U.S. Cl. .................................... 349/138; 349/156

(58) Field of Classification Search ................ 349/155, 349/156, 110, 43, 122, 138
See application file for complete search history.

(56) References Cited

U.S. PATENT DOCUMENTS

| | | | | |
|---|---|---|---|---|
| 5,739,890 A | * | 4/1998 | Uda et al. | 349/156 |
| 6,208,399 B1 | * | 3/2001 | Ohta et al. | 349/139 |
| 6,577,374 B1 | * | 6/2003 | Nakata et al. | 349/156 |
| 6,620,655 B1 | * | 9/2003 | Ha et al. | 438/149 |
| 6,642,986 B1 | * | 11/2003 | Melnik et al. | 349/149 |
| 6,788,372 B1 | * | 9/2004 | Kaise et al. | 349/122 |

FOREIGN PATENT DOCUMENTS

JP       2000206541 A   *   7/2000

* cited by examiner

*Primary Examiner*—Kenneth Parker
*Assistant Examiner*—David Chung
(74) *Attorney, Agent, or Firm*—McKenna Long & Aldridge LLP

(57) ABSTRACT

A liquid crystal display device includes a first substrate, a plurality of gate and data lines formed crossing each other on the first substrate to define a plurality of pixel areas, an insulating layer formed on the plurality of gate and data lines, a plurality of pixel electrodes formed within the plurality of pixel areas, a plurality of separators formed on the insulating layer between the plurality of pixel electrodes, and a second substrate facing the first substrate.

25 Claims, 5 Drawing Sheets

LIQUID CRYSTAL DISPLAY AND FABRICATING METHOD THEREOF

The present invention claims the benefit of Korean Patent Application No. P2001-86070 filed in Korea on Dec. 27, 2001, which is hereby incorporated by reference.

BACKGROUND OF THE INVENTION

1. Field of the Invention

The present invention relates to a liquid crystal display and a fabricating method thereof, and more particularly, to a liquid crystal display and a fabricating method thereof that prevents short circuiting and coupling between pixel electrodes.

2. Discussion of the Related Art

Many efforts are made to study a liquid crystal display as a flat panel display having advantages of a high contrast ratio and less power consumption as well as being suitable for gray scale or moving picture display. In general, a liquid crystal display includes a thin film transistor substrate having thin film transistors and pixel electrodes formed in pixel areas defined by gate and data lines, respectively, a color filter substrate having a color filter layer and a common electrode formed thereon, and a liquid crystal material layer formed between the two substrates. The liquid crystal display displays an image by applying a voltage to the pixel and common electrodes to align the liquid crystal molecules of the liquid crystal material layer to control transmission of light. Accordingly, if a portion of the liquid crystal display has an interval between the two substrates that is not uniform, transmittance through such a portion is varied and produces uneven brightness. Hence, spacers are inserted between the two substrates to maintain an uniform interval.

A liquid crystal display and fabricating method thereof according to a related art is explained by referring to the attached drawings as follows.

FIG. 1 illustrates a layout of a liquid crystal display according to a related art, FIG. 2A illustrates a cross-sectional view along I–I' in FIG. 1, and FIG. 2B illustrates a cross-sectional view along II–II' in FIG. 1.

A liquid crystal display according to a related art includes a color filter substrate, a thin film transistor substrate facing the color filter substrate, and a liquid crystal layer between the two substrates. The thin film transistor substrate 11, as shown in FIG. 1, includes gate lines 17 and data lines 18 crossing each other to define a pixel area, a thin film transistor 20 arranged at an intersection between the gate and data lines 17 and 18, and a pixel electrode 22 formed to be connected to the thin film transistor 20.

A method of fabricating a liquid crystal display according to a related art is explained by referring to FIG. 2A and FIG. 2B as follows.

First, a plurality of gate lines 17 are formed on a first substrate 11 to be substantially in parallel with each other. A gate insulating layer 24 is then formed on an entire surface of the first substrate 11 covering the gate lines 17. Then, a plurality of data lines 18 are formed on the gate insulating layer 24 to be substantially in parallel with each other.

The gate insulating layer 24 is deposited by plasma chemical vapor deposition (CVD) using an inorganic material such as silicon nitride ($SiN_x$) or silicon oxide ($SiO_x$), and the like having characteristics of adhesion to metal and withstanding pressure.

A thin film transistor is formed at each intersection between the gate and data lines 17 and 18. The thin film transistor is formed by stacking a gate electrode connected to the gate line, a semiconductor layer insulated from the gate electrode by the gate insulating layer, and source/drain electrodes on the semiconductor layer, successively.

Next, an inorganic insulating material such as silicon nitride ($SiN_x$) or silicon oxide ($SiO_x$) as a passivation layer 25 is deposited on an entire surface of the first substrate 11 covering the data lines 18. A pixel electrode 22 is then formed on the passivation layer 25 to be electrically connected to the drain electrode of the thin film transistor.

Then, a black matrix for cutting off light leakage and a common electrode for applying a voltage to a liquid crystal material layer are formed on a second substrate. To align the first and second substrates, alignment layers are formed of a polyimide (PI) based polymer on the first and second substrates. Alignment treatment is carried out on each of the alignment layers using a rubbing or light irradiating process.

Subsequently, ball spacers are positioned on the first substrate 11 to maintain a uniform interval between the first and second substrates. Next, a sealant is formed along a circumference of the second substrate to prevent liquid crystal material from leaking. Then, the first and second substrates are bonded together with the liquid crystal material formed therebetween.

There are a number of problems associated with the liquid crystal display and fabricating method according to the related art. For example, because the gate and data lines 17 and 18 are formed of metal, and the pixel electrode 22 is formed of conductive indium tin oxide (ITO), when the passivation layer 25 is formed of the inorganic material, such as $SiN_x$ or $SiO_x$, a dielectric ratio becomes high and parasite capacitances are formed between the data line 18 and pixel electrode 22, and between the gate line 17 and pixel electrode 22 when a voltage is applied. Due to the existence of parasite capacitances, the distances between the pixel electrode 22 and the gate and data lines 17 and 18 cannot be significantly reduced. In addition, enlarging an opening ratio is limited.

Moreover, the liquid crystal display according to the related art has a problem of short circuiting between the pixel electrodes 22 during the patterning process for forming the pixel electrodes 22. Even if the intervals between the pixel electrodes 22 are increased to prevent the short circuiting, an effective area of the corresponding pixel electrode 22 is reduced, thereby decreasing the opening ratio.

Furthermore, the ball spacers according to the related art are not suitable for a large-sized liquid crystal displays because the ball spacers fail to remain fixed within a liquid crystal cell and move to form scratches on the alignment layers, thereby generating image stains.

SUMMARY OF THE INVENTION

Accordingly, the present invention is directed to a liquid crystal display and a fabricating method thereof that substantially obviates one or more problems due to limitations and disadvantages of the related art.

An object of the present invention is to provide an improved liquid crystal display and a fabricating method thereof that prevents short circuiting and coupling between pixel electrodes.

Another object of the present invention is to provide an improved liquid crystal display and a fabricating method thereof to prevent pattern failure of the pixel electrodes and short circuiting generated from the residues of the pixel electrodes in the related art.

Another object of the present invention is to provide an improved liquid crystal display and a fabricating method thereof to maintain the cell gap uniformly, whereby no spacer is needed to avoid scratches by the conventional ball spacers and overcome troublesomeness of fabricating patterned spacers.

Another object of the present invention is to provide an improved liquid crystal display and a fabricating method thereof to minimize the coupling effect between the pixel electrodes and the lines, thereby overcoming image stains caused by the parasite capacitance in the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, a liquid crystal display device includes a first substrate, a plurality of gate and data lines formed crossing each other on the first substrate to define a plurality of pixel areas, an insulating layer formed on the plurality of gate and data lines, a plurality of pixel electrodes formed within the plurality of pixel areas, a plurality of separators formed on the insulating layer between the plurality of pixel electrodes, and a second substrate facing the first substrate.

In another aspect, a liquid crystal display device includes a first substrate, a plurality of gate and data lines formed on the first substrate, a plurality of thin film transistors formed at intersections between the gate and data lines, an insulating layer formed on an entire surface of the first substrate covering the thin film transistors, a plurality of separators formed on the insulating layer over the gate and data lines, a plurality of pixel electrodes formed between the separators, a second substrate facing the first substrate, and a liquid crystal material layer formed between the first substrate and the second substrate.

In another aspect, a method of fabricating a liquid crystal display includes the steps of forming a plurality of gate and data lines on a first substrate to cross each other, forming a plurality of thin film transistors at intersections between the gate and data lines, forming an insulating layer on an entire surface of the first substrate covering the thin film transistors, forming a plurality of separators on the insulating layer over the gate and data lines, forming a plurality of pixel electrodes on the insulating layer, forming a second substrate facing the first substrate, and forming a liquid crystal material layer between the first substrate and the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
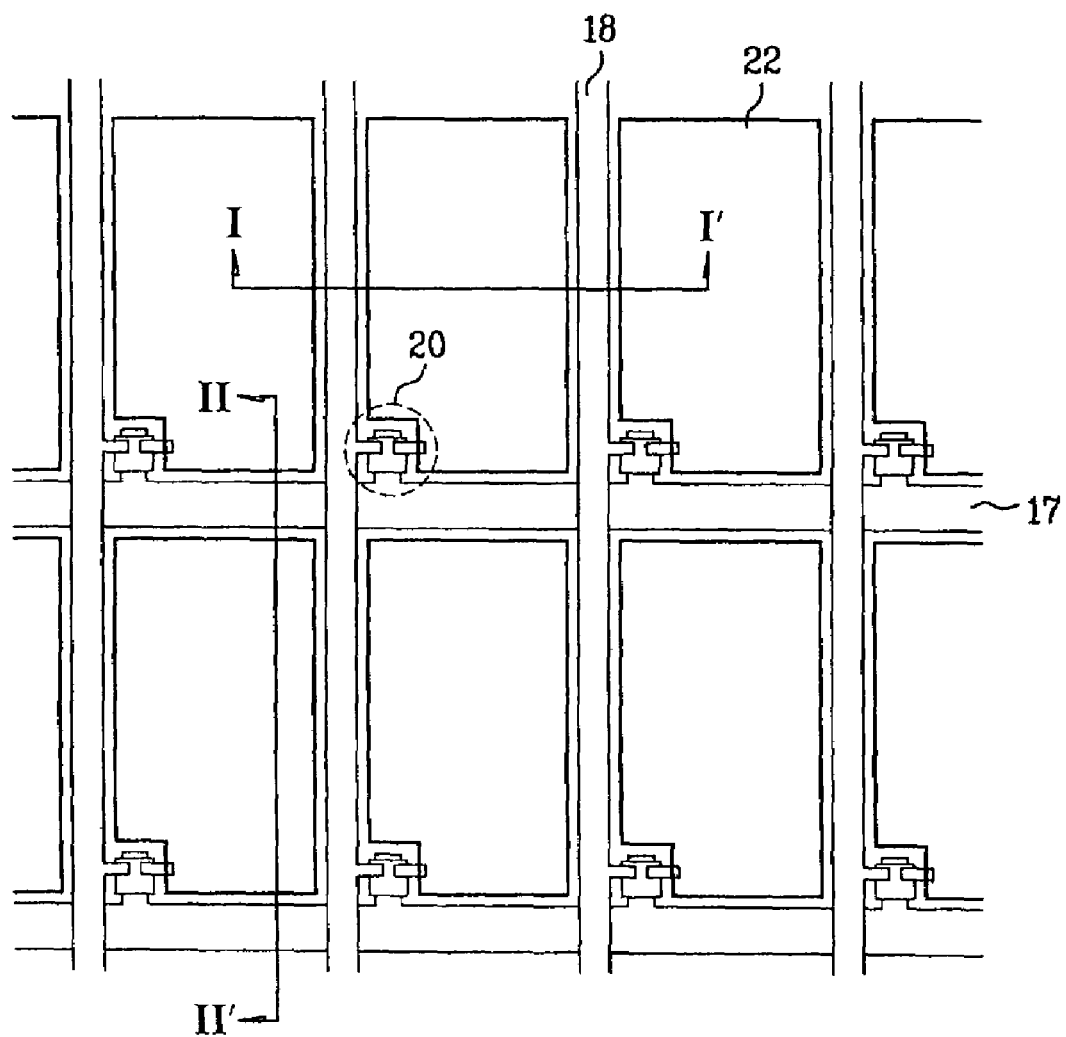
FIG. 1 illustrates a layout of a liquid crystal display according to a related art.
Figure 2A:
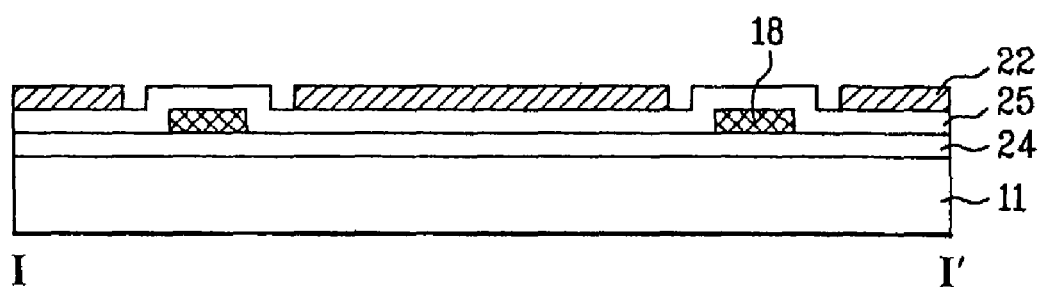
FIG. 2A illustrates a cross-sectional view along I–I' in FIG. 1.
Figure 2B:
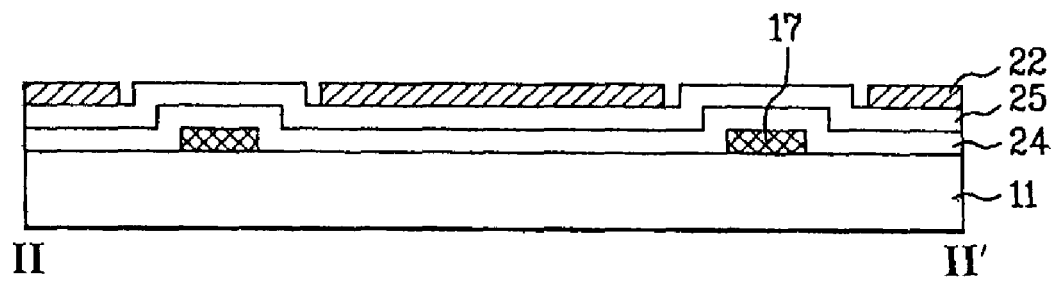
FIG. 2B illustrates a cross-sectional view along II–II' in FIG. 1.
Figure 3:
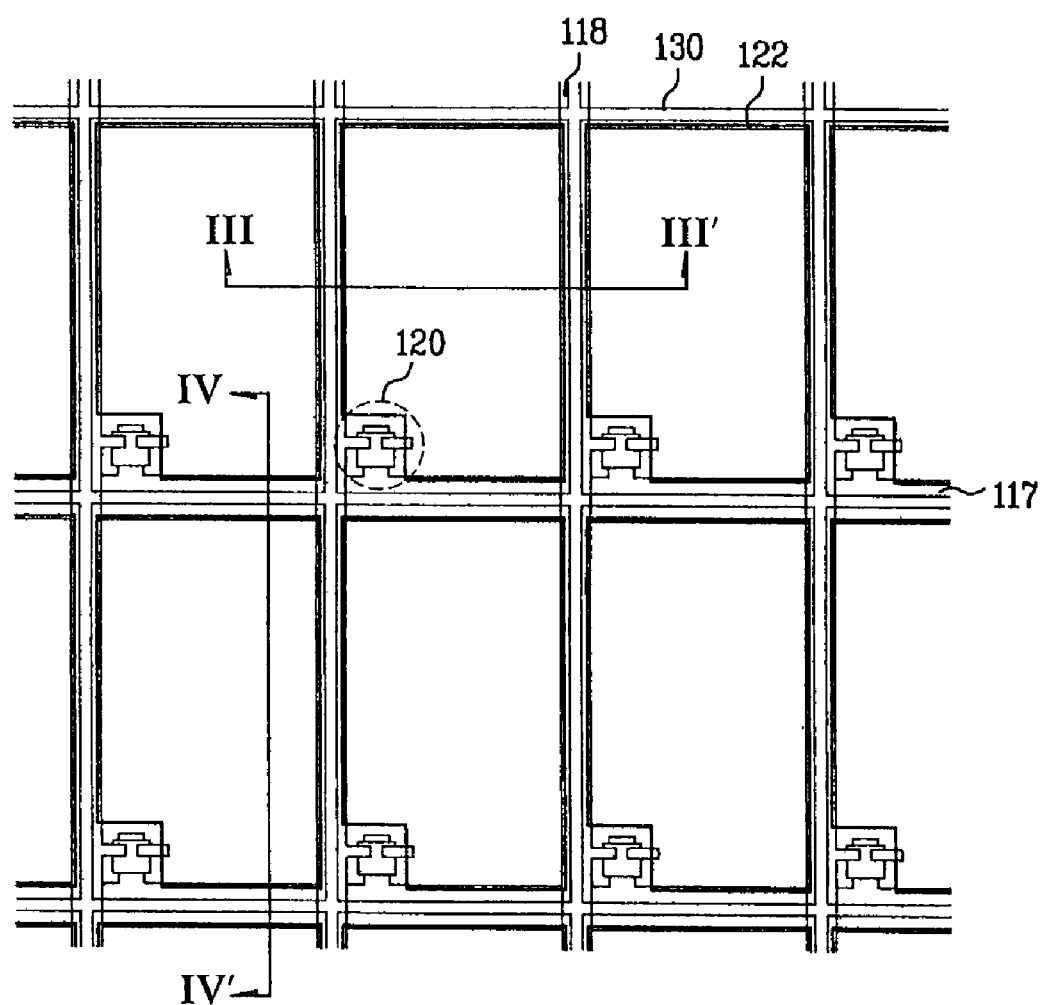
FIG. 3 illustrates a layout of an exemplary liquid crystal display according to an embodiment of the present invention.
Figure 4A:
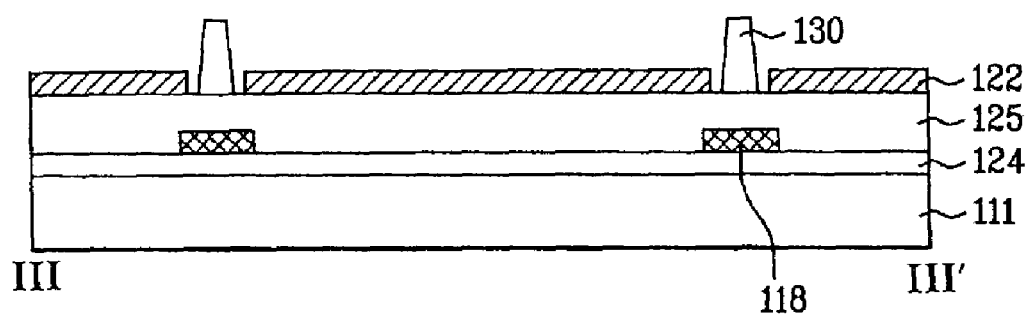
FIG. 4A illustrates a cross-sectional view along III–III' in FIG. 3 according to the present invention.
Figure 4B:
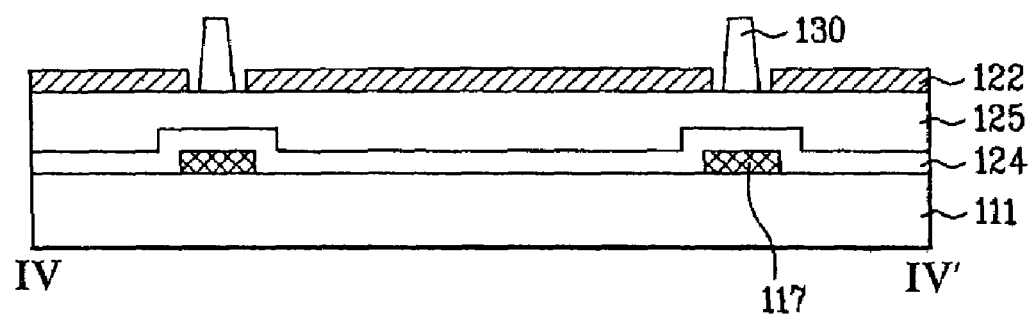
FIG. 4B illustrates a cross-sectional view along IV–IV' in FIG. 3, according to the present invention.

FIG. 3 illustrates a layout of an exemplary liquid crystal display according to an embodiment of the present invention, FIG. 4A illustrates a cross-sectional view along III–III' in FIG. 3, and FIG. 4B illustrates a cross-sectional view along IV–IV' in FIG. 3.

The liquid crystal display may include a color filter substrate having a color filter layer formed thereon, a thin film transistor substrate having switching devices formed thereon, and a liquid crystal material layer formed between the two substrates. The switching device may be thin film transistors (TFT) to switch an arrangement direction of liquid crystal molecules in the liquid crystal material layer.

As shown in FIG. 3, a thin film transistor substrate may include gate lines 117 and data lines 118 crossing each other to define a plurality of pixel areas, thin film transistors 120 formed at each intersection between the gate and data lines 117 and 118, a plurality of pixel electrodes 122 formed to be connected to the thin film transistors 120, and a plurality of separators 130 formed to overlap with the gate and data lines 117 and 118. The plurality of the separators 130 may maintain an interval between the color filter and thin film transistor substrates, and maybe formed of organic insulators between the pixel electrodes 122, thereby minimizing a coupling effect between the pixel electrodes 122.

An exemplary method of fabricating the thin film transistor substrate according to an embodiment of the present invention is explained in detail by referring to FIG. 4A and FIG. 4B as follows.

As shown in FIG. 4A, a metal may be deposited on a transparent substrate 111, and patterned to form gate lines 117 and gate electrodes (not shown). The metal may be made of aluminum (Al), an Al alloy, chromium (Cr), or molybdenum (Mo). Next, an inorganic material having an excellent insulating characteristic may be deposited on an entire surface of the transparent substrate 111, covering the gate lines 117 by, for example, a plasma enhanced chemical vapor deposition (PECVD) process, therefore forming a gate insulating layer 124 about 2000 Å thick. The inorganic material may be of silicon nitride ($SiN_x$).

Subsequently, polycrystalline silicon (α-Si) may be deposited on the gate insulating layer 124 over the gate electrodes (not shown) to form a semiconductor layer (not shown). Then a metal such as Mo may be deposited on the gate insulating layer 124 by a sputtering process, for example, and the metal layer may be patterned to form data lines 118. Alternatively, the metal layer may be patterned to simultaneously form source/drain electrodes on the semiconductor layer. The data lines 118 and source/drain electrodes may be about 1500–2000 Å thick.

In addition, the semiconductor layer may be doped with N+ impurities to form an ohmic contact layer (not shown) between the source/drain electrodes. The ohmic contact layer improves contact characteristics between the semiconductor layer and the source/drain electrodes. In addition, the ohmic contact layer may function as an etch-stop layer during patterning of the source/drain electrodes.

In FIG. 3, the gate and data lines 117 and 118 cross each other to define the pixel areas, and the gate electrode (not shown), gate insulating layer 124, semiconductor layer (not shown), ohmic contact layer (not shown), and source/drain electrodes constitute a single thin film transistor. Moreover, an organic material may be coated on an entire surface of the transparent substrate 111 covering the data lines 118 to form a passivation layer 125 about 30,000 Å thick. Accordingly, a surface of the passivation layer 125 may be planarized even if an underlying layer is not planarized. The passivation layer 125 may be formed of an organic material having a high opening ratio and low dielectric constant of about 2.4–2.6, such as benzocyclobutene (BCB) or an acryl resin. When the passivation layer 125 is formed with the organic insulating material having such a low dielectric constant, coupling effect between the gate and data lines 117 and 118 and the pixel electrodes 122 may be minimized. Accordingly, patterns of the pixel electrodes 122 may be formed relatively large to extend an opening area and to provide high brightness.

Subsequently, an organic insulating material may be coated on an entire surface of the transparent substrate 111 covering the passivation layer 125. Then, the organic insulating material layer may be patterned by a photolithographic process, for example, thereby forming a plurality of separators 130. If the plurality of separators 130 are formed with a photo-acryl material having a photosensitivity, exposure may be directly performed on the photo-acryl material. If the separators 130 are formed with BCB, an etch process using a photoresist may be performed to indirectly pattern the BCB.

For example, a top surface of each of the separators 130 may be rectangular or hemispheric shaped. If the top surface of the separators 130 is formed of the hemispheric shape, a contact area with the color filter substrate (not shown) may decrease, thereby preventing failure by a frictional force and pressed stains. In addition, each of the separators 130 may be about 3–5 μm wide and may be tapered. For example, a ratio between lower and upper widths of the separators 130 may be about 1.0-0.5. Alternatively or in addition to, a side wall of each of the separators 130 may form a contact angle of about 40–50° with a bottom wall of the separator 130.

After the separators 130 have been formed, ITO may be deposited and patterned by a photo-lithographic process to form pixel electrodes 122 connected to the drain electrodes of the thin film transistors 120. Alternatively, the pixel electrodes 122 may be formed before formation of the separators 130. Accordingly, since the separators 130 may be placed between the pixel electrodes 122, short circuiting between the pixel electrodes 122 by residual materials generated during the patterning processes may be prevented. Thus, the coupling effect between the pixel electrodes 122 may be minimized to maximize each size of the pixel electrodes 122.

Next, a PI-based polymer material may be printed on an entire surface of the transparent substrate 111, including the pixel electrodes 122 to form an alignment layer. Then, an alignment treatment may be performed on the alignment layer by a rubbing or light irradiation process, for example. Accordingly, when the alignment treatment is performed by a contact system such as rubbing, for example, electric charges may accumulate due to the friction between a rubbing cloth and the alignment layer. However, such accumulated electric charges would be dispersed through the separators 130, thereby reducing static electricity and eliminating an afterimage caused by the accumulated electric charges.

Figure 5A:
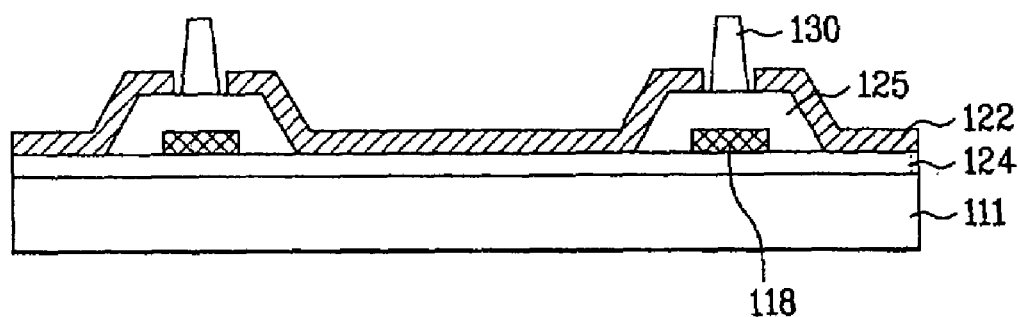
FIG. 5A and FIG. 5B illustrate cross-section views of a layout of another exemplary liquid crystal display according to another embodiment of the present invention.
Figure 5B:
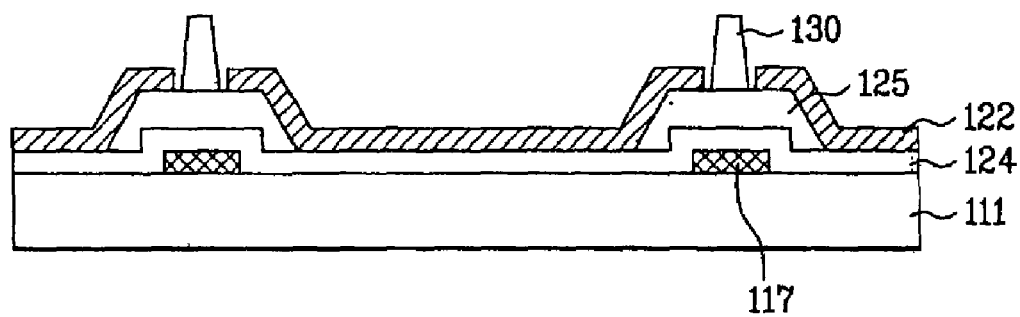

FIGS. 5A and 5B illustrate cross-section views of a layout of another exemplary liquid crystal display according to another embodiment of the present invention.

In FIGS. 5A and 5B, the passivation layer 125 may be formed on the gate and data lines 117 and 118, and the separators 130 may be formed on the passivation layer 125. The passivation layer 125 may be coated on the entire surface of the transparent substrate 111, covering the data lines 118, and patterned to remain over the gate and data lines 117 and 118. An organic insulating material may be coated on an entire surface of the transparent substrate 111, including the passivation layer 125, and patterned to form the separators 130 on the passivation layer 125 over the gate and data lines 117 and 118.

Alternatively, although not shown in the drawings, the passivation layer 125 and separators 130 may be formed integrally as a single body. For instance, an organic insulating layer may be formed on the entire surface of the transparent substrate 111, covering the data lines 118. Then, a mask may be formed over the gate and data lines 117 and 118, and an under-etch may be performed. Accordingly, unetched portions of the organic insulating layer form the separators 130, and under-etched portions of the organic insulating layer form the passivation layer 125.

It will be apparent to those skilled in the art than various modifications and variations can be made in the liquid crystal display and fabricating method thereof of the present invention without departing from the spirit or scope of the invention. Thus, it is intended that the present invention covers the modifications and variations of this invention provided they come within the scope of the appended claims and their equivalents.

What is claimed is:

1. A liquid crystal display device, comprising:
   a first substrate;
   a plurality of gate and data lines formed crossing each other on the first substrate to define a plurality of pixel areas;
   an insulating layer formed on the plurality of gate and data lines;
   a passivation layer covering portions of the insulating layer over the gate and data lines;
   a plurality of pixel electrodes formed within the plurality of pixel areas;
   a plurality of separators formed on the passivation layer between the plurality of pixel electrodes to overlap the gate and data lines without an intervening metal layer therebetween; and
   a second substrate facing the first substrate.

2. The device according to claim 1, wherein the separators include an organic insulating material.

3. The device according to claim 1, wherein top portions of the separators contact the second substrate.

4. The device according to claim 3, wherein the top portions are one of a rectangular and hemispheric shape.

5. A liquid crystal display device, comprising:
a first substrate;
a plurality of gate and data lines formed on the first substrate;
a plurality of thin film transistors formed at intersections between the gate and data lines;
an insulating layer formed on an entire surface of the first substrate covering the thin film transistors;
a passivation layer covering portions of the insulating layer over the gate and data lines;
a plurality of separators formed on the passivation layer over the gate and data lines without an intervening metal layer therebetween;
a plurality of pixel electrodes formed between the separators;
a second substrate facing the first substrate; and
a liquid crystal material layer formed between the first substrate and the second substrate.

6. The device according to claim 5, wherein the separators include an organic insulating material.

7. The device according to claim 5, wherein the passivation layer includes an organic insulating material.

8. The device according to claim 7, wherein the organic insulating material includes at least one of benzocyclobutene (BCB) and an acryl resin.

9. The device according to claim 5, wherein top portions of the separators contact the second substrate.

10. The device according to claim 9, wherein the top portions are one of a rectangular and hemispheric shape.

11. A liquid crystal display device, comprising:
a first substrate;
a plurality of gate and data lines formed on the first substrate;
a plurality of thin film transistors formed at intersections between the gate and data lines;
an insulating layer formed on an entire surface of the first substrate covering the thin film transistor;
a passivation layer covering portions of the insulating layer over the gate and data lines;
a plurality of separators formed on the passivation layer over the gate and data lines, wherein a ratio between top and bottom widths of the separators is about 1.0~0.5;
a plurality of pixel electrodes formed between the separators;
a second substrate facing the first substrate; and
a liquid crystal material layer formed between the first substrate and the second substrate.

12. A liquid crystal display device comprising:
a first substrate;
a plurality of gate and data lines formed on the first substrate;
a plurality of thin film transistors formed at intersections between the gate and data lines;
an insulating layer formed on an entire surface of the first substrate covering the thin film transistor;
a passivation layer covering portions of the insulating layer over the gate and data lines;
a plurality of separators formed on the passivation layer over the gate and data lines, wherein each of the separators have a contact angle thereof about 40~50°;
a plurality of pixel electrodes formed between the separators;
a second substrate facing the first substrate; and
a liquid crystal material layer formed between the first substrate and the second substrate.

13. A liquid crystal display device, comprising:
a first substrate;
a plurality of gate and data lines formed on the first substrates;
a plurality of thin film transistor formed at intersections between the gate and data lines;
an insulating layer formed on an entire surface of the first substrate covering the thin film transistors;
a passivation layer covering portions of the insulating layer over the gate and data lines;
a plurality of separators formed on the passivation layer over the gate and data lines; wherein a width of the separators is about 3~5µm;
a plurality of pixel electrodes formed between the separators;
a second substrate facing the first substrate; and
a liquid crystal material layer formed between the first substrate and the second substrate.

14. A method of fabricating a liquid crystal display, comprising the steps of:
forming a plurality of gate and data lines on a first substrate to cross each other;
forming a plurality of thin film transistors at intersections between the gate and data lines;
forming an insulating layer on an entire surface of the first substrate covering the thin film transistors;
forming a passivation layer over an entire surface of the first substrate;
removing the passivation layer except portions over the gate and data lines;
forming a plurality of separators on the passivation layer over the gate and data lines;
forming a plurality of pixel electrodes on the insulating layer;
forming a second substrate to face the first substrate; and
forming a liquid crystal material layer between the first substrate and the second substrate.

15. The method according to claim 14, wherein a ratio between top and bottom widths of the separators is about 1.0-0.5.

16. The method according to claim 14, wherein the separators have a contact angle of about 40–50°.

17. The method according to claim 14, wherein a width of the separators is about 3–5 µm.

18. The method according to claim 14, wherein the step of forming a plurality of separators includes forming a plurality of separators of an organic insulating material.

19. The method according to claim 14, wherein the step of forming a passivation layer includes forming a passivation layer of an organic insulating material.

20. The method according to claim 19, wherein the steps of forming a plurality of separators and forming a passivation layer are performed simultaneously.

21. The method according to claim 14, wherein the step of forming a plurality of separators is performed after the step of forming a plurality of pixel electrodes.

22. The method according to claim 14, wherein the step of forming a plurality of separators is formed before the step of forming a plurality of pixel electrodes.

23. A method of fabricating a liquid crystal display, comprising the steps of:
forming a plurality of gate and data lines on a first substrate to cross each other;
forming a plurality of thin film transistors at intersections between the gate and data lines;

forming an insulating layer on an entire surface of the first substrate covering the thin film transistors;

forming a passivation layer over an entire surface of the first substrate;

removing a first thickness of the passivation layer to a predetermined thickness except portions of the passivation layer over the gate and data lines;

forming a plurality of separators on the passivation layer over the gate and data lines;

forming a plurality of pixel electrodes on the insulating layer;

forming a second substrate to face the first substrate; and forming a liquid crystal material layer between the first substrate and the second substrate.

24. The method according to claim 14, wherein the step of forming a plurality of separators includes forming tops of the separators in rectangular or hemispheric shaped.

25. The method according to claim 14, wherein the step of forming a plurality of separators includes tapering side walls of the separators.

* * * * *